United States Patent

[11] 3,583,415

| [72] | Inventor | Verle D. Smith<br>Route 4, Box 309, Hillsboro, Oreg. 97123 |
|---|---|---|
| [21] | Appl. No. | 853,148 |
| [22] | Filed | Aug. 26, 1969 |
| [45] | Patented | June 8, 1971 |

[54] SUGAR BLENDING SYSTEM
9 Claims, 2 Drawing Figs.

[52] U.S. Cl. ................................................. 137/3,
99/186, 99/239, 165/141, 222/146
[51] Int. Cl. .................................................. A23b 7/00,
B67d 5/62
[50] Field of Search .......................................... 137/3, 334,
340; 165/141; 99/182, 186, 239, 240, 249; 141/82;
340; 165/141; 99/182, 186, 67, 318, 146

[56] References Cited
UNITED STATES PATENTS

| 3,039,479 | 6/1962 | Etheridge | 137/3 |
| 3,212,674 | 10/1965 | Martin | 222/67 |
| 3,241,475 | 3/1966 | Schack et al. | 99/182X |
| 3,282,468 | 11/1966 | Karlen | 222/67 |
| 3,386,497 | 6/1968 | Feldmeier | 165/141X |

*Primary Examiner*—Henry T. Klinksiek
*Attorney*—Buckhorn, Blore, Klarquist and Sparkman

ABSTRACT: Sugar syrups in different concentrations are provided in a plurality of tanks, each of which receives a predetermined flow of water and a pedetermined flow of concentrated syrup. The concentrated syrup is raised in temperature in a heat exchanger and is supplied at a constant pressure head whereby the flow thereof can be accurately maintained.

PATENTED JUN 8 1971

3,583,415

VERLE D. SMITH
INVENTOR

BY
BUCKHORN, BLORE, KLARQUIST & SPARKMAN
ATTORNEYS

SUGAR BLENDING SYSTEM

BACKGROUND OF THE INVENTION

Canned fruits are conventionally packed with varying syrup concentrations, such as in "light syrup," "heavy syrup," or the like, in accordance with established standards relative to a Brix scale expressing concentrations of sugar solutions. The syrups may be provided by the batch method wherein a volume of concentrated or substantially pure syrup is diluted with a predetermined amount of water in order to arrive at the desired solution. Each batch may be measured with a refractometer or the like for determining the proper concentration. The mixing of syrups by a batch method is, of course, cumbersome, and not well adapted to modern continuous canning processes. A continuous flow method is more desirable wherein the rates of flow of the concentrated syrup, and the water for diluting the same, are predetermined and a mixture is prepared from the continuous liquid flows. However, the flow of concentrated sugar syrup is not easily regulated because of the viscosity thereof, and unless an oversupply of concentrated syrup is provided in such a system, it is possible that the sugar solution will fall below prescribed standards. Continuous flow systems have also been devised for continuously monitoring the sugar concentration in the end solution and regulating the supply of concentrated syrup in response thereto in servomechanism fashion. Equipment of this kind is complex, and therefore expensive, and can become inaccurate and ineffective unless continuously operated and maintained by highly skilled personnel.

SUMMARY OF THE INVENTION

According to the present invention, two liquids are mixed, wherein one of the liquids is relatively viscous. The viscous liquid is heated to a predetermined temperature for establishing its viscosity, and this liquid is directed into a constant level tank whereby to establish and predetermined effective head therefor, resulting from such constant level and fixed viscosity. The flows of the two liquids can be regulated for a desired concentration by means of calibrated valves inasmuch as the liquid flows can be predetermined thereby.

Specifically, the liquids mixed are concentrated sugar syrup and water, wherein the pressure head of the water supply is predetermined and a constant head level is also maintained for the concentrated syrup. Heat exchanger means are employed for raising the temperature of the concentrated syrup to a predetermined value, and the heated syrup is substantially continuously circulated into and out of a constant level gravity tank. The rate of flow of the sugar syrup, both from the heat exchanger through a constant level tank and from the constant level tank to mixing means, is at least high enough to establish negligible temperature drop for the sugar syrup.

It is an object of the present invention to provide an improved method and apparatus for supplying mixtures of liquids in predetermined concentrations, wherein one liquid is a viscous liquid.

It is another object of the present invention to provide an improved method and apparatus for producing one or more sugar solutions on a substantially constant flow or demand basis, wherein continuous measurement of concentration is unnecessary.

It is a further object of the present invention to provide a continuous method and apparatus for supplying sugar solutions of predetermined concentrations with an economy in both the cost of equipment and skill of personnel.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is an overall diagram of a sugar blending system according to the present invention; and FIG. 2 is a detailed drawing of a regulating valve employed in the FIG. 1 system.

DETAILED DESCRIPTION

Figures 1, 2:
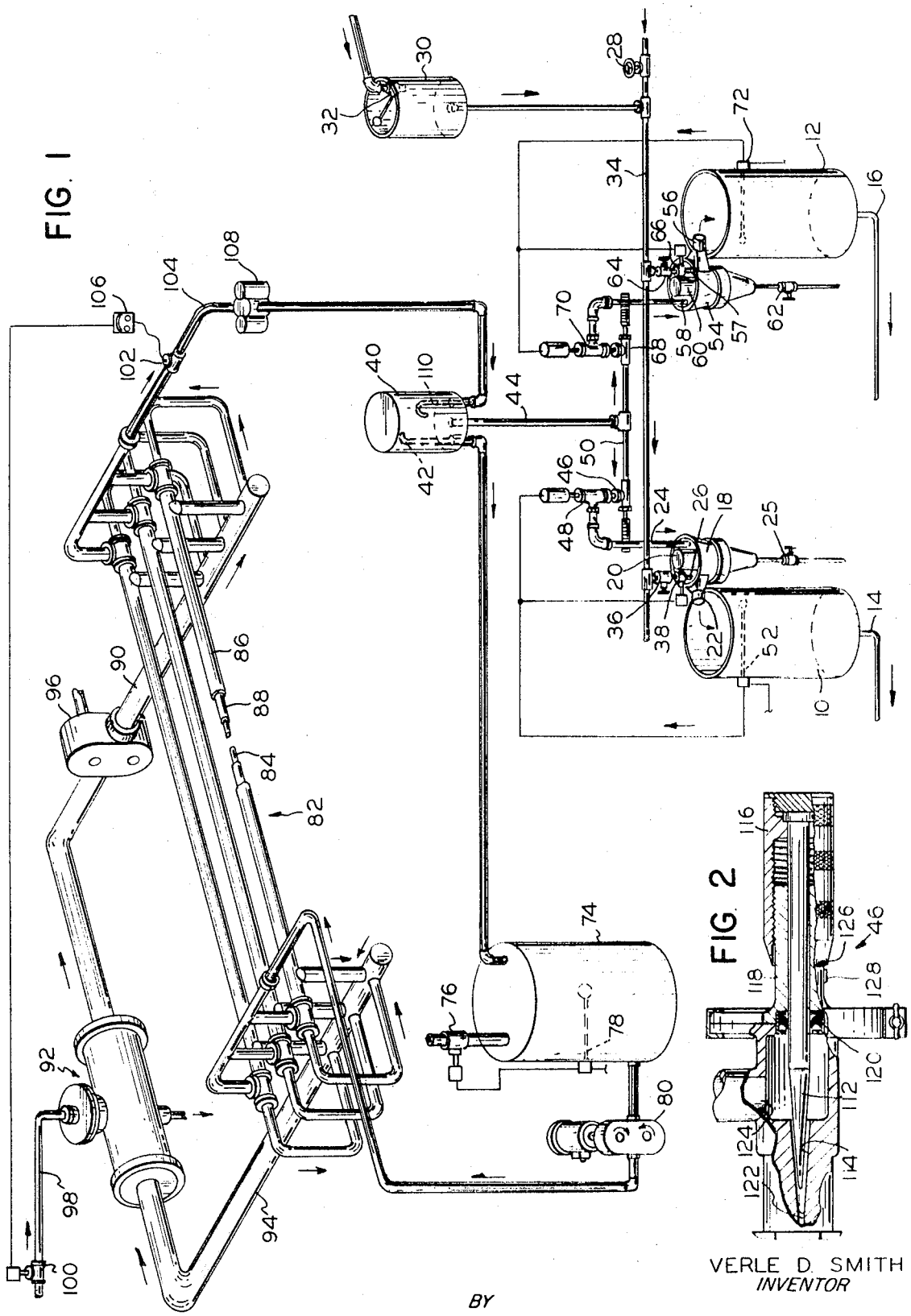

Referring to the drawings, and particularly to FIG. 1, a sugar blending system according to the present invention includes principal syrup tanks 10 and 12 from which different sugar solutions are withdrawn via outlet pipes 14 and 16, respectively. Although only two principal syrup tanks are illustrated in the drawing, it will be understood that a greater number may readily be employed in accordance with the number of different solutions required. Tank 10 is provided with a mixer 18 including a mixing motor 20 having appropriate vanes or a propeller mounted to the shaft thereof (not shown) for mixing concentrated syrup and water. The mixture is then delivered to tank 10 via run-off spout 22 at the upper end of the mixer. The mixer is suitably conical in shape and is provided with a drain pipe and valve 25 at the lower end thereof. The mixer is supplied concentrated syrup from line 24 and water from line 26, which are then thoroughly blended prior to delivery to tank 10 by way of spout 22. Alternatively, the mixing may be accomplished in tank 10, but the mixing prior to delivery of the solution to tank 10 is preferable for assuring adequate mixing before the solution reaches pipe 14.

Water is delivered to mixer 18 from a supply main by way of valve 28, if the local water pressure is reasonably constant or if the main can be provided with an adequate pressure regulator, or from water gravity tank 30. Gravity tank 30 is provided with a float switch 32 for turning the water supply on and off so as to maintain a constant water level and therefore a constant head above line 34 and mixer 18. Water is then delivered to line 26 and mixer 18 through regulating valve 36 and air operated shutoff valve 38.

Concentrated sugar syrup, e.g. corn syrup or the like, is provided at a constant level in sugar gravity tank 40, this level being determined by the level of top opening runoff pipe 42. The concentrated syrup has a greater and known concentration relative to the solutions desired. Tank 40 is suitably closed on top, but it is not airtight. Delivery line 44 from the bottom of tank 40 is connected to a regulating microvalve 46 via line 50 and from the microvalve by way of shutoff valve 48 to line 24. Since the level in tank 40 is maintained, as hereinafter more fully described, the pressure head of concentrated sugar syrup above line 50 and above the mixer is substantially constant.

Both shutoff valves 38 and 48 are rapidly acting air operated valves which turn off the supply of water and the supply of concentrated syrup in response to the operation of level switch 52. Level switch 52 suitably includes electrical contacts for controlling a solenoid which in turn controls the air supply for operating shutoff valves 38 and 48, this system being indicated schematically on the diagram.

Although level switches thus illustrated for tank 10, whereby the flow of water and concentrated syrup into mixer 18 is discontinued when tank 10 is full, there is no necessity that the level in tank 10 be maintained exactly constant. As an alternative, a pair of level switches may be employed, i.e. a first switch, located high in tank 10 acting to turn off valves 38 and 48 when the level gets too high, with a second switch being located at a second and lower level in tank 10 for turning these valves back on when the level gets too low. During operation of the system, demand of solution from the tank is nearly continuous.

Similarly, principal syrup tank 12 is fed from mixer 54 by way of spout 56, the mixer receiving water from line 57 and concentrated syrup from line 58. Mixer 54 also has a mixer motor 60 and a drain valve 62. A water control valve 64 and shutoff valve 66 are located between lines 34 and 57, while a microvalve 68 and a shutoff valve 70 are disposed between sugar line 50 and line 58. Shutoff valves 66 and 70 are controlled by level switch 72. As can thus be seen, tank 12 and the water and concentrated syrup supplies therefor are substantially the same as hereinbefore described in connection with tank 10.

A continuous supply of concentrated syrup for tanks 10 and 12 is provided by a portion of the system as illustrated in the upper part of FIG. 1. A concentrated sugar syrup tank or reservoir tank 74 is provided syrup by way of valve 76 operated by float switch 78 to maintain a reasonably constant quantity of syrup in reservoir tank 74. While a float switch is illustrated, a pair of switches may alternatively be employed, one for turning off valve 76 when the level in tank 74 becomes too high, and a second for turning on valve 76 when the level in tank 74 is too low. A motor operated pump 80 operates continuously for withdrawing concentrated syrup from the bottom of reservoir tank 74 and supplying the same to multiple tube heat exchanger 82. The heat exchanger 82 may be of the type known as a triple tube heat exchanger manufactured by Sanitary Processing Equipment Corporation of East Syracuse, New York. This heat exchanger includes an inner hot water tube 84, an outer hot water tube 86, and an intermediate tube 88 through which the concentrated syrup flows. These tubes are illustrated as broken away in one run of the heat exchanger in FIG. 1 for illustrative purposes only. Thus, hot water flows in tubes both within and around the tube 88 which carries the concentrated sugar syrup, whereby the sugar syrup may be heated to a desired temperature.

Hot water is supplied via header 90 from a shell and tube heat exchanger 92, with the hot water being returned to heat exchanger 92 via return header 94. A pump 96 continuously circulates water from heat exchanger 92 within tubes 86 and 84 of heat exchanger 82. Shell and tube heat exchanger 92 heats water by means of steam provided in line 98, the flow of which is regulated by shutoff valve 100. A temperature sensing means 102, suitably comprising a thermocouple in concentrated sugar line 104, operates temperature controller 106 for turning steam valve 100 off and on whereby the syrup temperature is maintained at a desired value selected by controller 106. The steam in heat exchanger 92 heats the water in header 90 to a value appropriate for heating the syrup to a uniform temperature above the normal ambient temperature thereof, but below a value at which crystallization would take place. Steam is not applied directly to the sugar syrup heat exchanger because of steam's undesirably high temperature.

Concentrated syrup is continuously delivered from line 104 to inlet pipe 110 which is desirably below the surface of the sugar syrup in tank 40. The standpipe run-off provided by pipe 42 maintains the level in tank 40 to provide a predetermined pressure head, as hereinbefore mentioned, as pump 80 continuously circulates the concentrated syrup into and out of tank 40. The flow of syrup caused by pump 80 is at the rate whereby substantially negligible temperature drop takes place between heat exchanger 82 and tank 40. Thus, the temperature sensing means 102 and controller 106 are effective to control the temperature of syrup in tank 40 because of the heating of the syrup and continuous flow thereof.

As a result of heating the concentrated syrup to a predetermined temperature, the viscosity of the syrup in tank 40 is maintained substantially constant to provide a constant "effective head" for the syrup, above mixers 18 and 54. The flow rate of syrup in lines 44, 50, and 24, for example, will be determined by the setting of microvalve 46, and will be substantially constant for a given setting of microvalve 46 so that a given percentage solution of concentrated syrup and water is achieved in tank 10. The volume of flow for concentrated syrup and water into mixer 18 and tank 10 will be maintained constant for given settings of valves 46 and 36 so long as shutoff valves 38 and 48 remain open. As long as these valves remain open, the flow rate between tank 40 and mixer 18 is normally rapid enough so that negligible temperature change occurs between tank 40 and mixer 18 whereby the viscosity of the concentrated syrup and the flow rate thereof will not change.

Of course, when the shutoff valves 38 and 48 are closed, the flow of concentrated syrup and water is discontinued. However, the liquids flow continuously enough during normal canning operations such that little change in temperature and viscosity of the sugar syrup occurs between tank 40 and tank 10 in the quite short distance therebetween, normally a matter of a few feet. While operation in connection with tank 10 has been mentioned principally above for purposes of illustration, it is understood the same description is also applicable to tank 12. The only difference will be the setting of microvalve 68 and valve 64 to achieve a different concentration.

Referring to FIG. 2, microvalve 46 is illustrated in greater detail. This valve comprises a needle valve having a conical spindle 112 positioned to cooperate with conical seat 114, the spindle being secured at its opposite end to barrel 116. Barrel 116 is accurately threaded internally to match external threads on body extension 118. Between barrel 116 and seat 114, spindle 112 passes through seal 120. The microvalve operates to adjust the amount of concentrated syrup flowing into port 122 from line 50 (in FIG. 1) and out port 124 connecting to shutoff valve 48. The construction of microvalve 68 is identical to that of valve 46. Also, microvalves of a similar type may be employed for water regulating valves 36 and 64.

For a given setting of valve 36, for example, a scale 126 on barrel 116, readable with respect to an index marker 128 on body extension 118, may be calibrated directly according to the Brix scale or in a percentage of concentrated syrup in the mixture. The initial setting or calibration may be accomplished with the aid of a refractometer, and if a setting is left constant, the percentage of concentrated syrup and water in the solution in tank 10 will remain constant inasmuch as the viscosity of the heated concentrated syrup is constant, and the flow rate thereof will remain unchanged.

While the present invention is particularly described in connection with concentrated sugar syrup and water, it will be appreciated the same method and apparatus is applicable to mixtures involving other viscous liquids wherein the correct mixture can be maintained constant by maintaining the temperature of the viscous liquid at a given value and by providing a constant pressure head therefor.

While I have shown and described preferred embodiments of my invention, it will be apparent to those skilled in the art that many changes and modifications may be made without departing from my invention in its broader aspects.

I claim:
1. The method of mixing sugar syrup and water, the process including the steps of:
   heating the sugar syrup to a predetermined temperature to establish its viscosity and then directing it into a constant level tank whereby to establish a predetermined effective head because of the constant level and fixed viscosity of such sugar syrup,
   the discharging the sugar syrup in the constant level tank therefrom, while maintaining the level constant, into a mixing tank,
   and discharging water into the mixing tank under pressure control in accordance with desired proportions desired in order to provide a liquid mixture maintained at a constant proportion of said sugar syrup consequent upon a predetermined flow at a predetermined pressure and temperature thereof into said mixing tank.

2. Apparatus for providing a flow of syrup at a constant percentage of sugar concentration comprising:
   at least one principal syrup tank from which said syrup at a constant percentage of sugar concentration is withdrawn,
   means having an outlet into said principal tank for supplying water, and concentrated syrup having a greater and known concentration, to said principal tank and for mixing said water and concentrated syrup,
   means connected to the last-named means for regulating the flow of concentrated syrup and water to said principal tank including adjustable microvalve means through which said concentrated syrup flows and means connected to said last-named means for providing a predetermined pressure head for said concentrated syrup and water, and means associated with said last-named means for heating said concentrated syrup so that said concentrated syrup substantially at the location of said means for providing a predetermined pressure head for said concentrated syrup attains a predetermined temperature for producing a predetermined flow rate thereof as determined by the setting of said microvalve means, the flow rate of said concentrated syrup normally being at least high enough to establish substantially negligible temperature drop thereof prior to mixing.

3. The apparatus according to claim 2 wherein said means for supplying concentrated syrup includes a concentrated syrup reservoir tank and pump means connected to said reservoir tank for pumping said concentrated syrup from said reservoir tank to said means for providing a predetermined pressure head for said concentrated syrup, said means for providing a predetermined pressure head for said concentrated syrup comprising a gravity tank substantially continuously receiving concentrated syrup from said reservoir tank as a consequence of action of said pump means, said gravity tank having a constant outflow level for establishing said predetermined pressure head, and said means for heating comprising a heat exchanger for heating said concentrated syrup pumped by said pump means to said gravity tank, wherein said concentrated syrup is pumped by said pump means at a rate for establishing substantially negligible temperature drop between said heat exchanger and said gravity tank whereby the temperature of said concentrated syrup in said gravity tank is constant and predetermined.

4. The apparatus according to claim 2 further including shutoff valve means between means for supplying water and said principal tank, and shutoff valve means between means for supplying concentrated syrup and said principal tank, and level control means on said principal tank for operating said shut-off valve means for discontinuing the flow of water and concentrated syrup into said tank when the mixture in said principal tank reaches a predetermined level.

5. The apparatus according to claim 2 wherein said microvalve means comprises a calibrated needle valve in connection between said means for supplying concentrated syrup and said principal tank.

6. The apparatus according to claim 2 including mixer means having an outlet into said principal tank and being separate from said principal tank into which said water and concentrated syrup is delivered for mixing prior to delivery to said principal tank.

7. The apparatus according to claim 2 wherein said means for supplying water comprises a water supply tank having level control means for providing water at a predetermined head, said means for regulating the flow of water comprising adjustable valve means between said water supply tank and said principal tank.

8. The apparatus according to claim 3 wherein:

said heat exchanger comprises a multiple tube heat exchanger through which said concentrated syrup flows, said heat exchanger including passages in heat conducting relation to the flow of concentrated syrup in said heat exchanger for receiving water heated to a predetermined temperature, a second heat exchanger connected to the first-mentioned heat exchanger for providing said heated water, said second heat exchanger receiving steam in heat exchanging relation to said water in said second heat exchanger, temperature measuring means for measuring the temperature of said concentrated syrup, and steam valve means connected to said second heat exchanger for interrupting the flow of steam to said second heat exchanger under the control of said temperature measuring means, for supplying steam to said second heat exchanger as required for raising the temperature of said concentrated syrup via the first mentioned heat exchanger to a predetermined temperature.

9. Apparatus for providing sugar solutions at predetermined sugar concentrations comprising:

a pair of principal tanks from which sugar syrup at predetermined concentrations may be withdrawn, means having an outlet into each of said tanks for supplying water at a predetermined head to said principal tanks and valve means for separately adjusting the flow of water into said tanks, a concentrated syrup reservoir tank, a gravity tank interconnected between said reservoir tank and said principal tanks substantially continuously receiving concentrated syrup from said reservoir tank, said gravity tank having a constant outflow level for providing a predetermined pressure head, heat exchanger means having an outlet into said gravity tank for heating the concentrated syrup provided to said gravity tank to a predetermined temperature, means for supplying concentrated syrup from said gravity tank to said principal tanks and valve means connected to the last-named means for separately adjusting the flow of syrup into said tanks, means associated with said principal tanks for mixing the concentrated syrup and water for each of said principal tanks, and means connected to said last-named means for shutting off the flow of concentrated syrup and water to each of said principal tanks according to the level of mixture in the respective principal tanks.